United States Patent
Meltzer et al.

(10) Patent No.: US 6,780,907 B2
(45) Date of Patent: Aug. 24, 2004

(54) BLOCK CHLORINATED POLYOLEFINS AS PHYSICAL PROPERTY ENHANCERS FOR POLYMER BLENDS

(75) Inventors: A. Donald Meltzer, Akron, OH (US); Dennis L. Lawson, Brunswick, OH (US); Robert E. Detterman, Medina, OH (US); Carole A. Lepilleur, Akron, OH (US)

(73) Assignee: Noveon IP Holdings Corp., Cleveland, OH (US)

( * ) Notice: Subject to any disclaimer, the term of this patent is extended or adjusted under 35 U.S.C. 154(b) by 33 days.

(21) Appl. No.: 10/095,893

(22) Filed: Mar. 11, 2002

(65) Prior Publication Data

US 2003/0040576 A1 Feb. 27, 2003

Related U.S. Application Data

(60) Provisional application No. 60/276,655, filed on Mar. 16, 2001.

(51) Int. Cl.$^7$ .......................... C08L 77/00; C08L 75/04; C08L 69/00; C08L 67/00
(52) U.S. Cl. ...................... 524/230; 524/277; 524/394; 524/425; 525/63; 525/66; 525/67; 525/89; 525/92 B; 525/92 C; 525/92 E; 525/92 F; 525/125; 525/166; 525/179; 525/185
(58) Field of Search .......................... 525/63, 66, 67, 525/89, 92 B, 92 C, 92 E, 92 F, 125, 166, 179, 185; 524/230, 277, 394, 425

(56) References Cited

U.S. PATENT DOCUMENTS

| | | | |
|---|---|---|---|
| 2,871,218 A | 1/1959 | Schollenberger | 260/45.4 |
| 2,999,835 A | 9/1961 | Goldberg | 260/42 |
| 3,028,365 A | 4/1962 | Schnell et al. | 260/47 |
| 3,334,154 A | 8/1967 | Kim | 260/860 |
| 4,001,184 A | 1/1977 | Scott | 260/47 XA |
| 4,035,440 A * | 7/1977 | Khanna et al. | 260/859 |
| 4,131,575 A | 12/1978 | Adelmann et al. | 260/17.4 R |
| 4,511,687 A | 4/1985 | Nakanishi et al. | 524/270 |
| 5,281,668 A | 1/1994 | Heggs et al. | 525/166 |

FOREIGN PATENT DOCUMENTS

| | | |
|---|---|---|
| JP | 57049639 | 3/1982 |
| JP | 02064148 | 3/1990 |
| JP | 02281058 | 11/1990 |
| JP | 02281059 | 11/1990 |
| JP | 03028265 | 2/1991 |
| JP | 05140428 | 6/1993 |
| JP | 8-3506 * | 1/1996 |
| JP | 8-3507 * | 1/1996 |
| JP | 09249797 | 9/1997 |
| JP | 10265633 | 10/1998 |

OTHER PUBLICATIONS

Advanced Organic Chemistry, 3$^{rd}$ Edition, Chapter 3, Mar. 1985, "Bonding Weaker Than Covalent, Hydrogen Bonding", pp. 71–74.
Textbook of Polymer Science, Fred Billmeyer, 2$^{nd}$ Edition, "Block Copolymers", p. 121.

* cited by examiner

Primary Examiner—Ana Woodward
(74) Attorney, Agent, or Firm—Joe A. Powell; Thoburn T. Dunlap

(57) ABSTRACT

A means to improve thermoplastic formulations in terms of the physical properties they exhibit, such as impact strength and ductility, have been developed. The addition of a block chlorinated polyolefin (b-CPO) to polymer blends in which at least one component comprises a halogen-free hydrogen-bond acceptor polymer, achieves the desired enhancement. The synergetic effect of the b-CPO with the selected polymer blend is demonstrated. Blends of thermoplastic polyurethanes, polycarbonates, copolyesters and copolyamides with a blend partner such as thermoplastic polyolefins, styrenic copolymers such as styrene acrylonitrile copolymers, styrene ethylene butylene styrene copolymers, high rubber graft copolymers such as acrylonitrile butadiene styrene copolymers, methylmethacrylate butadiene styrene copolymers and the b-CPO have enhanced ductility and impact resistance. The addition of 0.5 wt. % of b-CPO has been shown to improve impact strength by as much as 85% and elongation at break exhibited by the blend by as much as 170%.

28 Claims, No Drawings

BLOCK CHLORINATED POLYOLEFINS AS PHYSICAL PROPERTY ENHANCERS FOR POLYMER BLENDS

This application claims the benefit of Provisional application No. 60/276,655 filed Mar. 16, 2001.

FIELD OF INVENTION

The present invention relates to thermoplastic formulations exhibiting improved physical properties such as impact strength and ductility. A block chlorinated polyolefin (b-CPO) is added to thermoplastic blends in which at least one component comprises a halogen-free hydrogen-bond acceptor polymer to achieve the desired enhancement. The synergetic effect of the b-CPO with the selected thermoplastic blend is demonstrated. Blends of thermoplastic polyurethanes (TPU), Polycarbonates (PC), copolyesters (COPE) and copolyamides (COPA) with a blend partner such as thermoplastic polyolefins (TPO), styrenic copolymers such as styrene acrylonitrile (SAN), styrene ethylene butylene styrene copolymers (SEBS), high rubber graft copolymers such as acrylonitrile butadiene styrene (ABS), methylmethacrylate butadiene styrene (MBS) and polyolefins, and the b-CPO have enhanced ductility and impact resistance. The b-CPO comprises a polymeric product having both high chlorine content blocks (e.g., up to 50–75 wt. % chlorine) and relatively non-chlorinated crystallizable polyolefin blocks. The resulting polymer is characterized as a block copolymer in that the crystallizable polyolefin blocks are covalently bonded to the amorphous chlorinated block.

BACKGROUND OF INVENTION

Polymer blends, both thermoplastic and elastomeric, find their way into many applications because of the combination of physical properties that can be achieved. TPUs, for example, are generally formulated with other polymers in order to perform adequately for the intended use. Each component, while chosen to impart a particular advantage, is often accompanied by a corresponding undesired effect on another property. This invention relates the use b-CPOs to improve the ductility exhibited by the blend or to reduce the detrimental effect on certain properties that are observed as a result of blending. Chlorinated polyolefins, preferably conventional randomly chlorinated polyethylenes (e.g., Tyrin® from Dupont Dow Chemical) are commercially available. These chlorinated polyethylenes have been randomly (relatively homogeneously) chlorinated by using a swelling solvent and/or a chlorinating temperature above the crystalline melting temperature of the polyethylene. Traditionally, those who chlorinated polyethylene wanted to eliminate the crystalline polyethylene phase by chlorinating the crystallizable polyethylene segments, which inhibits or prevents further crystallization of the polyolefin. Residual crystalline fractions in a chlorinated polyethylene would require a processing temperature above the melting point while amorphous polyethylene fractions can be processed at a lower temperature. The use of higher chlorination temperatures and swelling solvents (which decrease residual crystallinity) also increase the rate of the chlorinating reaction, thus reducing costs. It has even been postulated that highly crystalline polyethylene would not be effectively chlorinated unless either it was heated above the crystalline melting temperature or the crystallinity was reduced by using a swelling solvent. This invention relates to the use of novel b-CPOs as additives to improve physical properties of polymer blends wherein at least one component is a polymer containing halogen-free hydrogen-bond accepting moieties such as TPUs, PCs, COPEs and COPAs etc.

SUMMARY OF INVENTION

Block chlorinated polyolefins (e.g., polyethylenes) can be prepared having from about 10 to about 60 wt. % preferably about 20 to about 60 wt. % bound chlorine based on the weight of the chlorinated polyolefin (e.g., polyethylene) and having from above about 25 to about 99 wt. % residual crystallizable polyolefin blocks, wherein said wt. % residual crystallizable blocks are expressed as a percentage based on the weight of crystallizable polyolefin in the polymer before chlorination. Such block chlorinated polyolefins can be prepared by a chlorination process employing a semi-crystalline polyolefin precursor comprising reacting the semi-crystalline polyolefin in a generally unswollen state at a temperature below its crystalline melting temperature with chlorine for a short period of time. Depending on the reaction conditions chosen (mostly time, chlorine pressure, and temperature), a free radical source, a catalyst, and/or UV radiation may be useful in the chlorination process. When the reaction conditions are suitable for quick chlorination, the amorphous portion of the polyolefin becomes highly chlorinated while the crystalline portion of the polyolefin remains significantly in the crystalline state.

The b-CPO, e.g., block chlorinated polyethylene (b-CPE), can allow a compounder to minimize the detrimental effect caused by the blending the selected polymers by reducing the amount of the selected blend partner required to achieve the desired level of impact or ductility. Examples of these blend partners include high rubber graft copolymers, styrenics such as SAN and SEBS, or polyolefins such as poly(propylene) (PP) and poly(ethylene) (PE). Without wishing to be bound by theory of invention, it is believed that the b-CPOs of this invention improve the adhesion between the immiscible blend partner phase and the halogen-free hydrogen-bond acceptor polymer.

DETAILED DESCRIPTION OF THE INVENTION

Block chlorinated polyolefins are added to polymer blends in which at least one component comprises a halogen-free hydrogen-bond acceptor polymer. The halogen-free hydrogen-bond acceptor polymers are those polymers that are devoid of halogen substitution and contain hydrogen-bond accepting moieties either in the backbone or in pendant groups. Hydrogen-bond accepting moieties are those that contain, for example, oxygen or nitrogen, as defined in "Advanced Organic Chemistry", 3rd Ed., Ch. 3, J. March, John Wiley and Sons, NY, NY 1985 which is herein incorporated by reference. Suitable halogen-free hydrogen-bond acceptor polymers include but are not limited to TPUs, PCs, COPEs, and COPAs. Blends of TPUs, PCs, COPEs and COPAs with the b-CPOs and at least one blend partner comprising high rubber graft polymers such as ABS and MBS; styrenics copolymers such as SAN, SEBS, SBS and SIS; TPOs such as PP, PE and copolymers and the b-CPO demonstrate enhanced ductility and impact resistance. Alternatively, the addition of the b-CPO could be used to reduce the level of blend partner required to meet impact or ductility targets and hence reduce the detrimental effect the blend partner may impart on other properties. For example, in the case where TPUs are the halogen-free hydrogen-bond acceptor polymer, using lesser amounts of blend partners would result in better retention of resilience, tear and abrasion.

The polyurethanes are well known to the art and are readily prepared from a variety of compounds having terminal functional groups reactive with diisocyanates. Normally used are hydroxyl-terminated compounds. The hydroxyl-terminated compounds or macroglycols usually have molecular weights greater than about 300 to 400. A great variety of such macroglycols have been prepared and proposed for commercial applications. The most commonly used macroglycols are hydroxyl-terminated polyesters, polyethers, polylactones and polybutadienes. Useful materials are obtained by reacting the organic diisocyanate with a mixture of a macroglycol and a low molecular weight difunctional chain extender such as an alkylene glycol or ether glycol, a cycloaliphatic glycol, or an aromatic-aliphatic glycol. The so-called prepolymer technique may be used where a excess of organic diisocyanate is first reacted with the macroglycol and then the low molecular weight difunctional chain extender is added, normally in amounts equivalent to react with substantially all of the free isocyanate groups.

The hydroxyl polyesters macroglycols are linear hydroxyl-terminated polyesters having molecular weights between about 500 and 4000 and acid numbers usually less than about 10. The polyesters utilized include those prepared by the polyesterification of aliphatic dicarboxylic acids including for example, adipic, succinic, pimelic, suberic, azealic, sebacic and the like or their anhydrides. Aromatic dicarboxylic acids may also be used, or mixtures of aliphatic and aromatic dicarboxylic acids. Useful acids include aliphatic dicarboxylic acids of the formula HOOC—R—COOH where R is an alkylene radical containing 2 to 8 carbon atoms. The phtalic acids are also useful. The glycol used in the preparation of the polyesters by reaction with the dicarboxylic acids are aliphatic glycols containing between 2 and 10 carbon atoms such as ethylene glycol, propanediol, butanediol, hexamethylene glycol, octamethylene glycol, 2-ethyl-1.6-hexanediol, neopentyl glycol and the like. Preparation of the specific polyesterurethanes from polyesters is described in U.S. Pat. No. 2,871,218 for example. Polyesteramides also are contemplated, usually by substitution of a diamine or amino alcohol for at least part of the glycol.

Poly($\epsilon$-caprolactone)diol macroglycols are the polyester reaction products of $\epsilon$-caprolactones whose polymerization has been initiated by bifunctional compounds having two active hydrogen-bond sites which are capable of opening the lactone ring and initiating polymerization of the lactone. These bifunctional materials may be represented by the formula HX—R—XH wherein R is an organic radical which can be aliphatic, cycloaliphatic, aromatic or heterocyclic and X is O, NH, and NR where R is a hydrocarbon radical that can be alkyl, aryl aralkyl and cycloalkyl. Such materials include diols, diamines and aminoalcohols preferably. Useful diols include alkylene glycols wherein the alkylene group contains 2 to 10 carbon atoms for example, ethylene glycol, 1.2-propane diol, 1,4-butanediol, hexamethylene glycol and the like. Ethylene glycol provides excellent polyesters.

The hydroxyl(polyalkylene oxide), or polyether, macroglycols preferably are essentially linear hydroxyl-terminated compounds having ether linkages as the major hetero-atom linkage joining carbons atoms. The molecular weights may vary between about 500 and 4000. The hydroxyl (polyalkylene oxide)s found useful include hydroxyl poly (methylene oxide)s such as hydroxyl poly(tetramethylene oxide), hydroxyl poly(trimethylene oxide), hydroxyl poly (hexamethylene oxide), hydroxyl poly(ethylene oxide), and the like of formula $HO[(CH_2)_nO]_xH$ wherein n is a number from 2 to 6 and x is an integer, and alkyl substituted types such as hydroxyl poly(1,2-propylene oxide). Preparation of polyurethanes from such polyethers is described in U.S. Pat. No. 2,899,411 for example.

If low molecular weight glycols are used as chain extender with the macroglycols and the organic diisocyanate, these normally are aliphatic glycols or ether glycols containing 2 to 10 carbon atoms. Typical glycols which have been employed include ethylene glycol, propylene glycol, 1,4-butanediol, hexanediol, 2-ethyl-1.6-hexanediol, neopentyl glycol and the like. Cycloaliphatic glycols such as cyclohexanedimethanol, and aromatic-aliphatic glycols such as bis-1,4($\beta$-hydroxyethoxy) benzene, may also be used.

The amount of glycol chain extender used with the macroglycol and the diisocyanate may vary from about 0.1 to 12 moles per mole of macroglycol. Excellent polyurethanes are obtained with a molar ratio of one mole of macroglycol and 1 to 5 moles of the small chain extender glycol. Substituted glycols also may be used.

The organic diisocyanates that are reacted with the macroglycols will include, for example, both aliphatic and aromatic diisocyanates. Such aliphatic diisocyanates include, for example, hexamethylene diisocyanate, methylene-bis(4-cyclohexyl isocyanate), isophorone diisocyanate, etc. The aromatic diisocyanates include naphthalene-1,5-diisocyanate, diphenyl methane-4,4'-diisocyanate, tolylene diisocyanate, p-phenylene diisocyanate, dichlorodiphenyl methane diisocyanate, dimethyl diphenyl methane diisocyanate, bi-benzyl diisocyanate, diphenyl ether diisocyanate, bitolylene diisocyanate and the like, for example, diisocyanates of the formula $OCN—C_6H_4—X—C_6H_4—NCO$ wherein X may be a valence bond, an alkylene radical containing 1 to 5 carbon atoms, NR (where R is an alkyl radical), oxygen, sulfur, sulfoxide, sulfone and the like.

About equimolar ratios of diisocyanate and diols may be used. When a small glycol chain extender is also used, the ratio of reactants employed may be varied from about 1.5 to 13 moles of organic diisocyanate per mole of macroglycol with 0.5 to 12 moles of the glycol. The amount of organic diisocyanate used is dependent of the total amount of glycol chain extender and macroglycol and normally is a molar amount essentially equivalent to the total of these latter two reactants so that there are essentially no free unreacted isocyanate groups remaining in the polymer. Excellent polyurethanes have been obtained when a molar ratio of one mole of macroglycol of molecular weight of about 800 to 2500, 1 to 3 moles of glycol, and 2 to 4 moles of the aromatic diisocyanate are caused to react. While essentially equimolar amounts of isocyanate and active hydrogen-bond groups are preferred, it will be understood that any excess of any reactant, preferably less than 10 percent of excess organic diisocyanate can be used.

Other halogen-free hydrogen-bond acceptor polymers include polycarbonates, copolyesters, copolyamides, polyesters, and polyamides. Polycarbonates are particularly desirable halogen-free hydrogen-bond acceptor polymers. As part of the literature, numerous PC patents exist and the specific type of PC set forth therein can be utilized. In PCs, groups of dihydric and polyhydric phenols are linked through carbonate groups. Typically, PCs are derived from bisphenol A and diphenyl carbonate through an ester exchange. PC can also be made by using small amounts of other polyhydric phenols. The aromatic PC may be prepared by reacting a dihydric phenol with a carbonate precursor such as phosgene, a haloformate or a carbonate ester. Such PC polymers may be described as possessing recurring structural units of the formula [—O—A—O—(C=O)—] wherein A is a divalent aromatic radical of the dihydric phenol employed in the polymer producing reaction. The dihydric phenols which may be employed to provide such aromatic PCs are mononuclear or polynuclear aromatic compounds containing as functional groups two hydroxy radicals, each of which is attached directly to a carbon atom of an aromatic nucleus. Typical dihydric phenols are 2,2-bis-(4-hydroxyphenyl)pentane, 2,4'-(dihydroxydiphenyl) methane, bis(2-hydroxyphenyl)methane, bis(4-hydroxyphenyl)methane, bis(4-hydroxyphenyl-5-nitrophenyl)methane, 2,6-dihydroxydiphenyl, 2,6-dihydroxynaphtalene, 2,4'-dihydroxydiphenylsulfone, bis(3,5-diethyl-4-hydroxyphenyl)sulfone, 4,4'-dihydroxydiphenyl ether, 4,4'-dihydroxy-3,3'-dichlorodiphenyl ether, 4,4'-dihydroxy-2,5-dihydroxydiphenyl ether and the like. A variety of additional dihydric phenols which may be employed to provide such polycarbonates are disclosed in commonly assigned Goldberg, U.S. Pat. No. 2,999,835. It is of course possible to employ two or more different dihydric phenols and a dihydric phenol in a combination with a glycol, an hydroxy-terminated polyester, or a dibasic acid in the event that a carbonate copolymer rather than homopolymer is desired for use. Branched PCs are also useful. To avoid unnecessary detailed description, the disclosures of U.S. Pat. Nos. 3,028,365; 3,334,154; 4,001,184; 4,131,575 are incorporated herein by reference. Aromatic PCs are widely commercially available with specific examples including General Electric's Lexan® polycarbonates, Dow Chemical's Calibre® polycarbonates and Bayer's Makrolon® polycarbonate resins.

Block chlorinated polyolefins are used to greatly enhance the ductility and impact resistance or used to reduce the amount of the blend partners required and hence to reduce any detrimental effect that they might have on certain properties. The b-CPEs are prepared by chlorinating a polyolefin at low temperatures such that a substantial portion of the crystalline regions of the polyolefin backbone (e.g., polyethylene) remain crystalline and less effectively chlorinated than the amorphous regions of the polyolefin backbone. This results in a blocky polymer as each polymer chain usually has both crystalline and amorphous regions in the backbone. The semi-crystalline polyolefin precursor to the b-CPO has desirably at least above about 25 wt. %, desirably at least 30 wt. %, more desirably at least 45 wt. %, and preferably at least 50 wt. % crystalline polyolefin portions in the backbone. Unless otherwise defined weight percent (wt. %) residual crystallinity is measured by differential scanning calorimeter (DSC) on prepared samples of the polyolefin using a heating rate of 10° C./min. starting at −150° C. and ending at 250° C. For the purpose of calculations the heat of melting ($\Delta H$) the chlorinated polyolefins excludes the weight of bound chlorine. The percent residual crystallinity is the crystallinity of the chlorinated polyolefin corrected for the chlorine content, expressed as a percentage of the crystallinity of the polyolefin precursor. A more detailed description and example calculations follow later.

The polyolefin precursor desirably contains at least 85, more desirably at least 90, preferably at least 95 mole %, and more preferably at least 98 mole % repeat units polymerized from monoolefins of 2 to 10 carbon atoms. Preferably the repeating units of the polyolefin are polymerized from alpha-monoolefins having from 2 to 4 carbon atoms. Preferred alpha-monoolefins include ethylene, propylene, and butene, most preferably ethylene. The polyolefin can be prepared by any polymerization process but Ziegler-Natta, Phillips, and metallocene polymerization processes are preferred as they result in high weight percentages of crystallinity. The foregoing olefinic monomers can be polymerized with other copolymerizable monomers so long as the polymer properties are not deleteriously affected. Preferably the polyolefins have densities at 25° C. of from about 0.93, or 0.94 to about 0.965, 0.97, or 0.98 g/cc. Desirably they have crystalline melting temperatures from about 110–160° C. or 124° C. to about 130, 135 or 160° C. and melt index values (ASTM D-1238 FR-E) of from about 0.01 to 40, about 0.05 to 20 preferred, and about 0.1 to 10 most preferred.

The chlorination procedure can be done in any media, preferably water, which does not appreciably swell the polyolefin (e.g., less than 10% increase in volume due to equilibrium swelling of the precursor polyolefin at 25° C. with the media, and preferably less than 5 volume % increase). The chlorination temperature is desirably less than 100° C. and more desirably from about 40° C. to about 90° C. or 100° C. and preferably from about 50° C. to about 70° C. or 80° C. The chlorination media can be a liquid at the chlorination conditions (temperature, pressure, etc.) or a gas. The precursor polyolefin is desirably in a particulate form with average particle size desirably from about 20 to about 500 $\mu$m. The chlorine can be added as a gas or a liquid and can be at pressures from about 5 or 10 pounds per square inch absolute (psia) to several hundred psia, and is preferably from about 15 to about 90 psia and most preferably from about 50 to about 90 psia. The amount of chlorine added can be determined in both systems by weight difference measurements either on the reactor or on the chlorine source. Alternatively or additionally the chlorine can be metered in.

Depending on the chlorination temperature it may be desirable to provide a free radical source, a catalyst, or ultraviolet radiation (UV) to accelerate the reaction. An example of a free radical source includes organic peroxyesters. An example of a catalyst includes oxygen. Examples of UV radiation include any light source capable of providing radiation in the UV range. The free radical sources, catalysts, and UV sources are well known to the chlorination art. Desirably any oxygen which may be in the reactor or with the polyolefin is removed prior to chlorination when UV and peroxyester processes are employed. The type, amount, and optimization conditions are disclosed in numerous patents and publications on chlorinating polymers and need not be discussed in detail here. The difference between prior chlorination processes and the process of this invention is the general absence of swelling solvents, and low temperature reaction conditions. After the chlorination is completed the chlorinated polyolefin is recovered from the media. Any by-products (e.g., HCl, etc.) can be removed or neutralized along with the removal of the excess chlorine, if any. Then the chlorinated polyolefin can be washed and dried in conventional manner.

The b-CPO desirably has a chlorine content from about 10, 20, 25, 27, 30, or 35 wt. % bound chlorine to about 50, 53, 55, or 60 wt. % chlorine. Desirably the b-CPO contains above 25 wt. % residual crystallinity, desirably at least 30 wt. %, and more desirably above 50 wt. % residual crystallinity. More preferably, the residual crystallinity can range from about 40, 50, 60, 70 or 80 to about 70, 80, 90, 95, or more wt. %. Desirably the crystalline phase has a melting temperature similar to the starting polyolefin (e.g., about 110, 120 or 124° C. to about 130, 135, or 160° C.).

Blend partners added to the halogen-free hydrogen-bond acceptor polymer of this invention comprise high rubber graft copolymers, polyolefins and styrenic copolymers. An exemplary high rubber graft copolymer composition includes the class of high rubber ABS graft copolymer resins, which may generally be described as graft copolymers of styrene and acrylonitrile on butadiene containing rubbers. Other high rubber graft copolymers include non-ABS polydiene rubber containing graft copolymers including methylmethacrylate-styrene-acrylonitrile grafted on polybutadiene or styrene-butadiene rubbers (MABS resins) and graft copolymers of methylmethacrylate and styrene grafted on polybutadiene or styrene-butadiene rubbers (MBS resins).

The high rubber graft copolymers are prepared by graft polymerizing less than about 50 wt % of at least one rigid monomer such as a vinyl aromatic monomer, an acrylic monomer, a vinyl nitrile monomer or a mixture thereof in the presence of more than about 50 wt % of a preformed rubbery polydiene substrate such as 1,3-diene polymer or copolymer thereof. In particular, the graft copolymers comprise from 50 wt % to 90 wt % of a rubbery substrate polydiene such as for example polybutadiene or polyisoprene or a copolymer of a 1,3-diene with less than about 50 wt % of a copolymerizable vinyl or vinylidene monomer such as for example an olefin, a styrene monomer, a (meth)acrylate ester monomer or a (meth)acrylonitrile monomer, and from 10 to 50 wt % of a rigid graft phase formed from at least one rigid vinylidene or vinyl monomer selected from the group consisting of vinyl aromatic monomers, (meth)acrylic monomers, vinyl nitrile monomers and mixtures thereof. A rigid monomer is a hardening monomer and for the purposes of this invention means a polymerizable vinyl or vinylidene monomer that when homopolymerized would exhibit a glass transition temperature greater than 20° C. The term rubbery substrate or rubbery copolymer means, as is conventionally recognized, a polymer having a rubbery or elastomeric character including a glass transition temperature generally below 0° C. and preferably below −70° C. The rubbery polymer can contain a polydiene which is partially hydrogenated.

In the preparation of the high rubber graft copolymers, either or both the rubbery or the rigid graft component may further include minor amounts, less than about 5 wt % of a copolymerization crosslinking monomer(s) such as di- or tri-functional monomer or combinations thereof to increase graft linking or/and crosslinking of either or both components. Preferably, crosslinking monomer(s) are absent. The high rubber graft copolymers can be prepared by conventional polymerization processes including emulsion, suspension, sequential emulsion-suspension, bulk and solution polymerization processes. These methods are known in the polymerization art, specifically directed toward the preparation of a wide variety of high rubber graft copolymers for impact modification of thermoplastic resins. Suitable specific embodiments of the particular impact modifiers can be prepared by any aforementioned polymerization means. The preferred polymerization processes are in aqueous media and include emulsion and suspension methods. The preferred process for preparing the rubbery portion is by way of emulsion polymerization as taught in the art.

Other blend partners include polyolefins such as PP, PE and copolymers and styrenic copolymers such as SAN, SEBS, SBS and SIS.

The amount of the halogen-free hydrogen-bond acceptor polymer is desirably from about 10 to about 95 wt. % and more desirably from about 25 to about 90 wt. %, most desirably from about 40 to 80 wt. %. The amount of the b-CPE is desirably from about 0.01 to about 10 wt. %, more desirably from about 0.05 to about 5 wt. %, most desirably from about 0.1 to 1 wt. %. The amount of the blend partner is desirably from about 5 to about 90 wt. % and more desirably from about 10 to about 75 wt. %, most desirably from about 20 to 60 wt. %. In the case of a glassy thermoplastic modifier such as SAN, its amount is less than about 40 wt. %. The amount is restricted to provide domains of SAN less than about 10 microns.

The halogen-free hydrogen-bond-acceptor polymer can be compounded with a wide variety of other ingredients to increase processability and other properties of the in-process or finished (extruded, molded or shaped) article. Lubricants such as oxidized polyethylene, fatty acid esters and fatty amides can be included in the compounds. Fillers are optional. The method of compounding is straightforward as any high intensity method known to uniformly mix and fuse the components into a homogeneous compound such as an extruder or a Banbury mill can be used, the latter followed by sheeting, slitting or extrusion into pellets or cubes. Typical processing temperature may range from about 150 to 350° C., preferably from about 170 to about 300° C., most preferably from about 190 to 260° C.

A characteristic property of the b-CPO synthesized by this process is their substantial residual crystallinity that can be measured via thermal analysis, i.e., by differential scanning calorimetry (DSC). As is known, DSC, as described in *Textbook of Polymer Science* by Fred Billmeyer (second edition, page 121), is a technique in which the temperature of a reference substance and a sample are measured and controlled to conform to a predetermined time-temperature program. At the same time, temperature differences which develop between the reference and the sample, especially when the sample undergoes a thermal transition, are compared and the heat input in both the reference or the sample is adjusted to maintain equal temperatures. A signal proportional to these power differences is then plotted. The area under the resulting curve is a direct measure of the heat of transition. The percent crystallinity of the b-CPOs can be quantitatively established by comparing the area under the peak corresponding to the heat of melting, divided by the area under the peak corresponding to the heat of melting of a standard sample of known crystallinity. The residual crystallinity of the chlorinated polyolefins herein cited can be established by using the ratio of the corrected heat of melting (enthalpy of fusion) of the prepared chlorinated samples (i.e., corrected so to be estimated per gram of polyolefins by subtracting the weight of bound chlorine from the sample weight) over the enthalpy of fusion of the precursor polyolefin (% $\Delta H_R$ of residual polyolefin crystallinity).

An example of the calculation for the residual polyethylene crystallinity of a block chlorinated polyethylene b-CPE is as follows:

The enthalpy of fusion ($\Delta H$) for a block chlorinated polyethylene, containing 25 wt. % chlorine (about 75 wt. % polyethylene) was measured by DSC and found to be $\Delta H_{b-CPE\ uncorrected}=117$ J/g. So the enthalpy of fusion per gram of polyethylene (corrected for the weight of chlorine) will be $\Delta H_{b-CPE}=117/0.75$ or $\Delta H_{b-CPE}=156$ J/gPE. The enthalpy of fusion of the starting polyethylene before chlorination was found to be $\Delta H_{PE}=161$ J/g. So the residual polyethylene crystallinity can be calculated as being the ratio 156/161 or about 0.97, i.e., 97% of residual polyethylene crystallinity. This shows that essentially only the amorphous polyethylene phase was chlorinated.

Chlorine contents of the b-CPE were measured by $^{13}$C-NMR. Approximately 10 wt. % of b-CPE is dissolved in 1,2,4-trichlorobenzene. Benzene-d6 is added at about 10% by volume of the total solvent for the deuterium lock. One drop of hexamethyldisiloxane is added as a chemical shift reference. Carbon-13 data is collected with overnight data accumulation using conditions such as, 110° C. measurement temperature, total delay time between pulses of 7.5 seconds, 90° C. Carbon-13 pulse and a composite pulse decoupling (CDP) with no corrections for Nuclear Overhauser Effect (NOE) differences.

The following examples are included herein for purposes of illustration only and are not intended to be limiting of the scope of the invention.

EXAMPLES

In the following examples, the b-CPE used in the blends will be characterized as follow:

| b-CPE | MI[a] (g/10 min) | Chlorine Content[b] (wt. %) | Residual crystallinity (%) |
|---|---|---|---|
| 1 | 8.4[c] | 19 | 99[e] |
| 2 | 0.3[d] | 36 | 82[f] |
| 3 | 8.4[c] | 40 | 59[g] |

[a]Melt index measured by ASTM D-1238 FR-E.
[b]Chlorine content measured by $^{13}$C NMR
[c]Based on HDPE T60800 commercially available from Solvay having a density of 0.961 g/cm$^3$ (ASTM D-4683).
[d]Based on HDPE CB53-35H-11 commercially available from Solvay having a density of 0.955 g/cm$^3$ (ASTM D-4683).
[e]The residual crystallinity for the b-CPE and is calculated as previously described in the embodiment: The enthalpy of fusion ($\Delta H$) for b-CPE 1 containing 19 wt. % chlorine (about 81 wt. % polyethylene) was measured by DSC and found to be $\Delta H_{b\text{-}CPE\ uncorrected}$ = 145.9 J/g. So the enthalpy of fusion per gram of polyethylene (corrected for the weight of chlorine) will be $\Delta H_{b\text{-}CPE}$ = 145.9/0.81 or $\Delta H_{CPE}$ = 180.1 J/gPE. The enthalpy of fusion of the starting polyethylene T60-800 before chlorination was found to be $\Delta H_{PE}$ = 181.8 J/g. So the residual polyethylene crystallinity can be calculated as being the ratio 180.1/181.8 or about 0.99, i.e. 99% of residual polyethylene crystallinity.
[f]The enthalpy of fusion ($\Delta H$) for b-CPE 2 containing 36 wt. % chlorine (about 64 wt. % polyethylene) was measured by DSC and found to be $\Delta H_{b\text{-}CPE\ uncorrected}$ = 101.9 J/g. So the enthalpy of fusion per gram of polyethylene (corrected for the weight of chlorine) will be $\Delta H_{CPE}$ = 101.9/0.64 or $\Delta H_{b\text{-}CPE}$ = 159.2 J/gPE. The enthalpy of fusion of the starting polyethylene CB53-35H-11 before chlorination was found to be $\Delta H_{PE}$ = 192.1 J/g. So the residual polyethylene crystallinity (X) for b-CPE 2 can be calculated as being the ratio X = 159.2/192.1 or about 0.83, i.e. 83% of residual polyethylene crystallinity.
[g]The enthalpy of fusion ($\Delta H$) for b-CPE 3 containing 40 wt. % chlorine (about 60 wt. % polyethylene) was measured by DSC and found to be $\Delta H_{CPE\ uncorrected}$ = 64.7 J/g. So the enthalpy of fusion per gram of polyethylene (corrected for the weight of chlorine) will be $\Delta H_{CPE}$ = 64.7/0.60 or $\Delta H_{CPE}$ = 107.8 J/gPE. The enthalpy of fusion of the starting polyethylene T60-800 before chlorination was found to be $\Delta H_{PE}$ = 181.8 J/g. So the residual polyethylene crystallinity for b-CPE3 can be calculated as being the ratio 107.8/181.8 or about 0.59, i.e. 59% of residual polyethylene crystallinity.

Example 1
Blends of TPU, SAN and Block Chlorinated Polyethylene

Blends of TPU, Estane® 58144 commercially available from Noveon, Inc., a SAN copolymer, Tyril® 125 commercially available from Dow Chemical, containing 31 wt. % of acrylonitrile comonomer, and two different types of b-CPE were formulated according to the following recipe:

| Ingredients (wt. %): | 1 | 2 | 3 |
|---|---|---|---|
| Estane ® 58144 | 80 | 79.5 | 79.5 |
| Tyril ® 125 | 20 | 20 | 20 |
| b-CPE 2 |  | 0.5 |  |
| b-CPE 3 |  |  | 0.5 |

| Notched Izod impact at 73° F. (ASTM D256) | | | |
|---|---|---|---|
| ft. lb./in. | 19.0 | 25.4 | 25.9 |
| Std. Dev. | 7.7 | 1.1 | 0.5 |
| Plastic tensile at 73° F. (ASTM D638-95) | | | |
| Elongation at break (%) | 295 | 302 | 318 |
| Stress at break (psi) | 5660 | 6160 | 6250 |
| Modulus (Kpsi) | 93.6 | 82.8 | 80.3 |

Physical Property Results:

The ingredients were melt-mixed at 210° C. in a corotating twin screw extruder and strand pelletized. The pellets were then dried and injection molded into samples of various configurations required for ASTM testing methods.

The results obtained with the b-CPE/SAN modified TPU blends were compared to a standard where no b-CPE was added to the blend. Notched Izod impact values in these blends were measured at 73° F. and indicated a significant increase of 33 to 35% of the impact resistance upon the addition of 0.5 wt. % of b-CPE. The molecular weight of the b-CPE does not show a significant difference on the impact properties improvement. The percent elongation is also improved, which indicates that a more ductile material is produced upon addition of the b-CPE.

Example 2
Blends of TPU, SAN and Block Chlorinated Polyethylene

In a manner similar to that described in Example 1, blends of TPU, Estane® 58137 commercially available from Noveon, Inc., an ABS copolymer, Cycolac® GPX3800 commercially available from GE Plastics, a SAN copolymer, Tyril® 125 commercially available from Dow Chemical, and several b-CPEs were formulated according to the following recipe:

| Ingredients (wt. %) | 1 | 2 | 3 | 4 |
|---|---|---|---|---|
| Estane ® 58137 | 40 | 39.5 | 39.5 | 39.5 |
| Tyril ® 125 | 25 | 25 | 25 | 25 |
| Cycolac ® GPX3800 | 35 | 35 | 35 | 35 |
| b-CPE 1 |  | 0.5 |  |  |
| b-CPE 2 |  |  | 0.5 |  |
| b-CPE 3 |  |  |  | 0.5 |

Physical Property Results

| Izod impact, notched, at 73° F. (ASTM D256) | | | | |
|---|---|---|---|---|
| ft. lb./in. | 9.9 | 11.8 | 11.7 | 12.0 |
| Std. Dev. | 0.6 | 0.9 | 0.2 | 0.4 |
| Plastic Tensile test at 73° F. (ASTM D-638) | | | | |
| Elongation at break (%) | 48.1 | 68.6 | 85.3 | 86.6 |
| Stress at break (psi) | 4060 | 4010 | 4030 | 4080 |
| Modulus (Kpsi) | 234 | 233 | 227 | 237 |

In this Example, the results obtained with the b-CPE/ABS/SAN modified TPU blends were compared to a standard where no b-CPE was added. The results show a ca. 20% improvement in the impact resistance as illustrated by the Notched Izod data, upon addition of a b-CPE and the elongation at break results show a 43 to 80% improvement upon addition of 0.5 wt % of b-CPE. The melt index, the chlorine content and the manufacturer of the precursor HDPE utilized to make the b-CPE does not affect impact properties improvement.

Example 3

Blends of TPU, Block Chlorinated Polyethylene, Polypropylene and SEBS Copolymer.

In a manner similar to that described in Example 1, blends of TPU, Estane® 58142 commercially available from Noveon, Inc., polypropylene, PP6323 commercially available from Montell, a SEBS terpolymer, Kraton® G1726 commercially available from Shell, and several b-CPEs were formulated according to the following recipe:

| Ingredients (wt %): | 1 | 2 | 3 | 4 |
|---|---|---|---|---|
| Estane ® 58142 | 50 | 49.5 | 49.5 | 49.5 |
| PP 6323 | 20 | 20 | 20 | 20 |
| Kraton ® G1726 | 20 | 20 | 20 | 20 |
| b-CPE 1 | | 0.5 | | |
| b-CPE 2 | | | 0.5 | |
| b-CPE 3 | | | | 0.5 |

Physical Properties Results:

| Izod impact, notched, at 73° F., ASTM D256 | | | | |
|---|---|---|---|---|
| ft. lb./in. | 4.1 | 6.8 | 6.0 | 7.0 |
| Std. Dev. | 0.2 | 0.2 | 0.7 | 0.1 |
| Plastic Tensile test at 73° F., ASTM D-638 | | | | |
| Elongation at break (%) | 28.5 | 52.2 | 52.9 | 76.6 |
| Stress at break (psi) | 583 | 553 | 584 | 571 |
| Modulus (Kpsi) | 118 | 104 | 102 | 104 |

In this example, the results obtained with the b-CPE/PP/SEBS modified TPU blends were compared to a standard where no b-CPE was added. The results show 46% to 71% improvement in the impact resistance as illustrated by the Notched Izod data, and 83% to 169% improvement in elongation at break, upon addition of 0.5 wt % of a b-CPE.

Example 4

Blends of Filled TPU/SAN and Block Chlorinated Polyethylene.

In a manner similar to that described in Example 1, a blend of TPU, Estane® 58130 commercially available from Noveon, Inc., a SAN copolymer, Tyril® 125 commercially available from Dow Chemical, calcium carbonate and b-CPE was formulated according to the following recipe:

| Ingredients (wt %) | 1 | 2 |
|---|---|---|
| Estane ® 58130 | 55 | 54.5 |
| Tyril ® 125 | 25 | 25 |
| Calcium carbonate | 20 | 20 |
| b-CPE 3 | | 0.5 |

Impact Results:

| Izod impact, notched, at 73° F. (ASTM D256) | | |
|---|---|---|
| ft. lb./in. | 5.9 | 10.9 |
| Std. Dev. | 0.1 | 1.7 |
| Plastic Tensile test at 73° F. (ASTM D-638) | | |
| Elongation at break (%) | 291 | 328 |
| Stress at break (psi) | 4320 | 3940 |
| Modulus (Kpsi) | 87.8 | 53.8 |

In this Example, the results obtained with the filled TPU/SAN blend were compared to a standard where no b-CPE was added. The results show an 85% improvement in the impact resistance at room temperature as illustrated by the Notched Izod data, and a 13% improvement in elongation at break, upon addition of 0.5 wt % of a block chlorinated polyethylene.

Example 5

Blends of TPU, Polypropylene and Block Chlorinated Polyethylene.

In a manner similar to that described in Example 1, blends of TPU, Estane® 58142 commercially available from Noveon, Inc., polypropylene, PP41E2 commercially available from Huntsman, a SEBS terpolymer, Kraton® G1726 commercially available from Shell, chopped fiber glass, Star Stran® 719 commercially available from Johns-Manville, and several b-CPEs were formulated according to the following recipe:

| Ingredients (wt %) | 1 | 2 | 3 | 4 | 5 |
|---|---|---|---|---|---|
| Estane ® 58142 | 65 | 64.5 | 64.5 | 64.5 | 64.5 |
| PP41E2 | 15 | 15 | 15 | 15 | 15 |
| Kraton ® G1726 | 10 | 10 | 10 | 10 | 10 |
| Star Stran ® 719 | 10 | 10 | 10 | 10 | 10 |
| b-CPE 1 | | 0.5 | | | |
| b-CPE 2 | | | 0.5 | | |
| b-CPE 3 | | | | 0.5 | |
| Conventional CPE (Tyrin ® 3611)[1] | | | | | 0.5 |

[1]Commercially available from Dow Chemical, residual crystallinity = 2% as reported in literature.

Impact Results:

| Izod impact, notched, at 73° F. (ASTM D256) | | | | | |
|---|---|---|---|---|---|
| ft. lb./in. | 5.8 | 6.5 | 6.3 | 6.5 | 5.7 |
| Std. Dev. | 0.3 | 0.4 | 0.7 | 0.3 | 0.4 |
| Plastic Tensile test at 73° F. (ASTM D-638) | | | | | |
| Elongation at break (%) | 30 | 44 | 38 | 49 | 31 |
| Stress at break (psi) | 2340 | 1340 | 1400 | 1310 | 1850 |
| Modulus (Kpsi) | 205 | 191 | 203 | 194 | 199 |

The ingredients were processed as described in example 1. In this Example, the results obtained were compared to a standard where no b-CPE was added. The results show about 10% improvement in the impact resistance at room temperature as illustrated by the Notched Izod data, and a 26 to 63% improvement in elongation at break, upon addition of 0.5 wt % of a block chlorinated polyethylene. In comparison, the addition of 0.5 wt. % of a randomly chlorinated CPE (typical non-blocky CPE) such as Tyrin® CPE 3611, does not provide any enhancement in either impact or elongation at break.

Example 6
Blends of PC, ABS and Block Chlorinated Polyethylene.

In a manner similar to that described in Example 5, blends of PC, Lexan® 121 commercially available from GE Plastics, an ABS copolymer, Cycolac® GPX3800 commercially available from GE Plastics, and several b-CPE were formulated according to the following recipe:

| Ingredients (wt %) | 1 | 2 | 3 | 4 |
|---|---|---|---|---|
| Lexan ® 121 | 75 | 74.5 | 74.5 | 74.5 |
| Cycolac ® GPX3800 | 25 | 25 | 25 | 25 |
| b-CPE 1 |  | 0.5 |  |  |
| b-CPE 2 |  |  | 0.5 |  |
| b-CPE 3 |  |  |  | 0.5 |

Impact Results:

| Izod impact, notched, at 73° F. (ASTM D256) | | | | |
|---|---|---|---|---|
| ft. lb./in. | 8.0 | 8.4 | 8.5 | 9.3 |
| Std. Dev. | 0.4 | 0.8 | 0.5 | 0.9 |
| Plastic Tensile test at 73° F. (ASTM D-638) | | | | |
| Elongation at break (%) | 29 | 41 | 57 | 55 |
| Stress at break (psi) | 5580 | 6060 | 6280 | 6320 |
| Modulus (Kpsi) | 326 | 624 | 625 | 335 |

In this Example, the results obtained with the polycarbonate/ABS blends were compared to a standard where no b-CPE was added. The results show about 15% improvement in the impact resistance at room temperature as illustrated by the Notched Izod data, and a 43 to 98% improvement in elongation at break, upon addition of 0.5 wt % of a b-CPE.

Example 7
Synthesis of Block Chlorinated Polyethylene from UV Irradiation

A 2-gallon jacketed reactor (suitable for chlorination reactions) provided with means of agitation, feed lines, pressure and temperature recording instruments, and appropriate valves and piping was charged with 4,000 g of demineralized water, 0.3 g of a commercial wetting agent (Thompson-Hayward T-DET-N8) and 300 g of high density polyethylene powder (Microthene® FA700-00 from Quantum Chemical Corporation), having a density of 0.953 g/cm$^3$ as measured by ASTM D-1505 on compression molded samples and a melt index of 10.5 g/10 min according to ASTM D-1238 FR-E. Microthene® powder particles, which are spherical with an average particle size of ca. 20 $\mu$m, were slurried in water. After evacuation to 6 psia (pounds per square inch absolute), nitrogen was charged to the reactor until the pressure reached 104 psia. The reactor was again evacuated to 6 psia and nitrogen was added until the pressure was 102 psia. The reactor was again evacuated to 6 psia. The temperature was then increased to 50° C. Chlorine was added until the pressure in the reactor reached 28 psia. The reactor was evacuated to 9 psia and chlorine was added to 30 psia. The reactor was then evacuated to 10 psia. The agitation was started at ca. 500 rpm. Liquid chlorine was added until the pressure reached 50 psia. The reaction was initiated by the presence of free radicals generated via UV irradiation. Chlorine was fed such as to maintain a constant reaction temperature and pressure throughout the reaction (50° C. and 50 psia). The total volume of liquid chlorine added was 400 cm$^3$. After the completion of chlorine addition, the temperature was maintained at 50° C. with the UV light still turned on. After 190 minutes, the pressure dropped to 7 psia, indicating the reaction was complete. The polymer was removed from the slurry and given multiple extractions with hot water until all the acid was removed. The product was dried in a vacuum oven at 50° C. The chlorine content was measured by $^{13}$C-NMR as described previously and found to be 50 wt. % chlorine. The residual crystallinity was measured by DSC according to the fore-mentioned test procedure (ASTM D-3417) and found to contain at least 70% residual crystallinity.

Example 8
Chlorinated Polyethylene from UV Irradiation

Essentially the procedure of Example 7 was used. 300 g of a high density polyethylene pellets (HDPE 9602) purchased from Chevron Chemical, having a density of 0.960 g/cm$^3$ (ASTM D-4683) and a melt index of 0.25 g/10 min (ASTM D-1238 FR-E) were cryogenically ground to an average particle size of ca. 250 $\mu$m and then charged into the reactor. The total volume of chlorine fed was 250 cm$^3$. The chlorination was completed in 120 minutes. The chlorine content was measured by $^{13}$C-NMR as described previously and found to be 38 wt. % chlorine. The residual crystallinity was measured by DSC according to the fore-mentioned test procedure (ASTM D-3417) and found to contain 98% residual crystallinity.

The compositions of this invention are useful in multiple applications where plastics are used, such as molded parts and extruded parts for use in construction, automotive, and consumer products.

What is claimed is:

1. A polymer blend composition comprising:
    a) from about 10 to about 95 wt. % of said polymer blend composition being at least one halogen-free hydrogen-bond acceptor polymer resin selected from the group consisting of polyurethanes, polycarbonates, polyesters, polyamides. copolyesters, copolyamides and mixtures thereof;
    b) from about 0.01 to about 10 wt. % of said polymer blend composition being at least one block chlorinated polyolefin having at least above 25 wt. % residual blocks of crystalline polyolefin based on 100% of the weight of crystalline blocks of the polyolefin precursor, wherein said block chlorinated polyolefin has both crystalline and amorphous realons in its backbone; and
    c) from about 5 to about 90 wt. % of said polymer blend composition being at least one blend partner selected from the group consisting of methylmethacrylate-butadiene-styrene copolymers, acrylonitrile-butadiene-styrene copolymers, styrene acrylonitrile copolymers, styrene-butadiene-styrene copolymers, styrene-ethylene-butylene-styrene copolymers, styrene-isoprene-styrene copolymers, polypropylene, polyethylene, polypropylene copolymers, polyethylene copolymers, and mixtures thereof.

2. The polymer blend composition according to claim 1 wherein said block chlorinated polyolefin is selected from the group consisting of block chlorinated polyethylene, block chlorinated polypropylene, block chlorinated poly(1-butene), and mixtures thereof.

3. The polymer blend composition according to claim 2 wherein the amount of said block chlorinated polyolefin is from about 0.05 to about 5 wt. % of the total weight of said polymer blend composition.

4. The polymer blend composition according to claim 3 wherein the amount of said block chlorinated polyolefin is from about 0.1 to about 1 wt. % of the total weight of said polymer blend composition.

5. The polymer blend composition according to claim 1 wherein the amount of said halogen-free hydrogen-bond acceptor polymer is from about 25 to about 90 wt. % of the total weight of said polymer blend composition.

6. The polymer blend composition according to claim 5 wherein the amount of said halogen-free hydrogen-bond acceptor polymer is from about 40 to about 80 wt. % of the total weight of said polymer blend composition.

7. The polymer blend composition according to claim 1 wherein the amount of said blend partner is from about 10 to about 75 wt. % of the total weight of said polymer blend composition.

8. The polymer blend composition according to claim 7 wherein the amount of said blend partner is from about 20 to about 60 wt. % of the total weight of said polymer blend composition.

9. The polymer blend composition according to claim 1 wherein said block chlorinated polyolefin has a chlorine content of from about 10 to about 60 wt. % of the total weight of said block chlorinated polyolefin.

10. The polymer blend composition according to claim 9 in the form of a molded, extruded or shaped article.

11. The polymer blend composition according to claim 10, wherein said article is an injection molded article, or a transfer molded article.

12. The polymer blend composition according to claim 1 wherein the residual blocks of crystalline polyolefin in said block chlorinated polyolefin is above about 30 wt. % based on 100% of the weight of crystalline blocks of the polyolefin precursor.

13. The polymer blend composition according to claim 12 wherein the residual blocks of crystalline polyolefin in said chlorinated polyolefin is above about 50 wt. %, based upon the total weight of crystalline blocks in the polyolefin precursor of said chlorinated polyolefin.

14. The polymer blend composition according to claim 13 wherein the residual blocks of crystalline polyolefin in said chlorinated polyolefin is above about 70 wt. %, based upon the total weight of crystalline blocks in the polyolefin precursor of said chlorinated polyolefin.

15. The polymer blend composition according to claim 14 wherein the residual blocks of crystalline polyolefin in said chlorinated polyolefin is above about 90 wt. %. based upon the total weight of crystalline blocks in the polyolefin precursor of said chlorinated polyolefin.

16. The polymer blend composition of claim 1 comprising at least one lubricant.

17. The polymer blend composition of claim 16 comprising at least one filler.

18. The polymer blend composition of claim 17 wherein said filler is selected from the group consisting of calcium carbonate and chopped fiberglass and said lubricant is selected from the group consisting of oxidized polyethylene, fatty acid esters and fatty amides.

19. The polymer blend composition of claim 1 in the form of a pellet or cube.

20. A process for producing a polymer blend composition comprising a step of blending from about 10 to about 95 wt. % of said polymer blend composition of a halogen-free hydrogen-bond acceptor polymer resin in melt form with from about 0.01 to about 10 wt. % of said polymer blend composition of at least one block chlorinated polyolefin and from about 5 to about 90 wt. % of said polymer blend composition of at least one blend partner selected from the group consisting of methylmethacrylate-butadiene-styrene copolymers, acrylonitrile-butadiene-styrene copolymers, styrene acrylonitrile copolymers, styrene butadiene styrene copolymers, styrene ethylene butylene styrene copolymers, styrene isoprene styrene copolymers, polypropylene, polyethylene, polypropylene copolymers, polyethylene copolymers and mixtures thereof to form a dispersed phase, wherein said halogen-free hydrogen-bond acceptor polymer resin is selected from the group consisting of polyurethanes, polycarbonates, polyesters, polyamides, and mixtures thereof; wherein said block chlorinated polyolefin has above 25 wt. % residual blocks of crystallizable polyolefin, based upon the total weight of crystalline blocks of the polyolefin precursor of said chlorinated polyolefins.

21. The process according to claim 20 wherein said block chlorinated polyolefin has from about 10 to about 60 wt. % bound chlorine.

22. The process according to claim 22 wherein said block chlorinated polyolefin is selected from block chlorinated polyethylene, block chlorinated polypropylene and block chlorinated poly(1-butene).

23. The process according to claim 20 wherein the residual blocks of crystalline polyolefin in said block chlorinated polyolefin is above about 30 wt. %, based upon the total weight of crystalline blocks in the polyolefin precursor of said chlorinated polyolefin.

24. The process according to claim 23 wherein the residual blocks of crystalline polyolefin in said chlorinated polyolefin is above about 50 wt. %, based upon the total weight of crystalline blocks in the polyolefin precursor of said chlorinated polyolefin.

25. The process according to claim 24 wherein the residual blocks of crystalline polyolefin in said chlorinated polyolefin is about about 70 wt. %, based upon the total weight of crystalline blocks in the polyolefin precursor of said chlorinated polyolefin.

26. The process according to claim 25 wherein the residual blocks of crystalline polyolefin in said chlorinated polyolefin is above about 90 wt. %, based upon the total weight of crystalline blocks in the polyolefin precursor of said chlorinated polyolefin.

27. The process according to claim 20 in which processing temperatures do not exceed 260° C.

28. The process according to claim 20 wherein said blending is performed in an extruder or injection molding machine.

* * * * *

UNITED STATES PATENT AND TRADEMARK OFFICE
CERTIFICATE OF CORRECTION

PATENT NO. : 6,780,907 B2
DATED : August 24, 2004
INVENTOR(S) : A. Donald Meltzer et al.

It is certified that error appears in the above-identified patent and that said Letters Patent is hereby corrected as shown below:

Column 14,
Line 52, please delete "realons" and insert -- regions --.

Column 16,
Line 30, please delete "22" and insert -- 20 --.

Signed and Sealed this

Thirty-first Day of May, 2005

JON W. DUDAS
*Director of the United States Patent and Trademark Office*